(12) United States Patent
Shinozaki et al.

(10) Patent No.: US 9,785,237 B2
(45) Date of Patent: Oct. 10, 2017

(54) ELECTRONIC DEVICE AND CONTROL METHOD OF ELECTRONIC DEVICE

(71) Applicant: KYOCERA CORPORATION, Kyoto-shi, Kyoto (JP)

(72) Inventors: Takayuki Shinozaki, Yokohama (JP); Takashi Miyake, Sagamihara (JP)

(73) Assignee: KYOCERA CORPORATION, Kyoto (JP)

( * ) Notice: Subject to any disclaimer, the term of this patent is extended or adjusted under 35 U.S.C. 154(b) by 72 days.

(21) Appl. No.: 14/371,754

(22) PCT Filed: Jan. 11, 2013

(86) PCT No.: PCT/JP2013/000113
§ 371 (c)(1),
(2) Date: Jul. 11, 2014

(87) PCT Pub. No.: WO2013/105518
PCT Pub. Date: Jul. 18, 2013

(65) Prior Publication Data
US 2015/0042461 A1 Feb. 12, 2015

(30) Foreign Application Priority Data

Jan. 13, 2012 (JP) .................. 2012-005560
Jan. 13, 2012 (JP) .................. 2012-005567
Jan. 13, 2012 (JP) .................. 2012-005571

(51) Int. Cl.
*H04B 3/36* (2006.01)
*G06F 3/01* (2006.01)
*G06F 3/0488* (2013.01)
*G08B 6/00* (2006.01)

(52) U.S. Cl.
CPC ............ *G06F 3/016* (2013.01); *G06F 3/0488* (2013.01); *G08B 6/00* (2013.01); *G06F 2203/014* (2013.01)

(58) Field of Classification Search
None
See application file for complete search history.

(56) References Cited

U.S. PATENT DOCUMENTS

2006/0161870 A1 7/2006 Hotelling et al.
2006/0170660 A1 8/2006 Miyata et al.
2007/0057926 A1 3/2007 Ohzawa et al.
(Continued)

FOREIGN PATENT DOCUMENTS

JP   03-070020 A   3/1991
JP   08-063289 A   3/1996
(Continued)

OTHER PUBLICATIONS

Office Action mailed Jan. 20, 2015, corresponding to Japanese patent application No. 2013-553275.
(Continued)

*Primary Examiner* — Julie Lieu
(74) *Attorney, Agent, or Firm* — Hauptman Ham, LLP

(57) ABSTRACT

An electronic device includes a tactile sensation providing unit 30 configured to provide a tactile sensation to a contact object being in contact with a panel 10 and a controller 50 configured to control the tactile sensation providing unit 30 based on an amount of change of data based on press to the panel 10.

14 Claims, 14 Drawing Sheets

(56) References Cited

U.S. PATENT DOCUMENTS

| | | |
|---|---|---|
| 2007/0097151 A1 | 5/2007 | Rosenberg |
| 2009/0322695 A1* | 12/2009 | Cho .................... G06F 3/0416 345/173 |
| 2011/0050588 A1 | 3/2011 | Li et al. |
| 2011/0057886 A1 | 3/2011 | Ng et al. |
| 2011/0102340 A1* | 5/2011 | Martin .................. G06F 1/1662 345/173 |
| 2011/0115734 A1 | 5/2011 | Harashima et al. |
| 2011/0141047 A1* | 6/2011 | Iwaizumi ................ G06F 3/016 345/173 |
| 2011/0242029 A1 | 10/2011 | Kasahara et al. |
| 2011/0267181 A1* | 11/2011 | Kildal .................... G06F 3/016 340/407.2 |
| 2011/0267294 A1* | 11/2011 | Kildal .................... G06F 3/0414 345/173 |
| 2012/0154330 A1* | 6/2012 | Shimizu ................. G06F 3/016 345/174 |
| 2012/0188066 A1 | 7/2012 | Ujii et al. |
| 2012/0249314 A1 | 10/2012 | Kuwabara |
| 2013/0027324 A1* | 1/2013 | Martin .................. G06F 1/1662 345/173 |
| 2013/0113747 A1* | 5/2013 | Aono .................... G06F 3/0416 345/173 |
| 2013/0127765 A1 | 5/2013 | Behdasht et al. |
| 2013/0314356 A1* | 11/2013 | Miyake ................ G06F 3/0488 345/173 |
| 2013/0314357 A1* | 11/2013 | Sudou ................. G06F 3/0488 345/173 |
| 2013/0321337 A1* | 12/2013 | Graham ............. G06F 3/03547 345/174 |
| 2014/0145994 A1* | 5/2014 | Burrough ............... G06F 3/016 345/173 |
| 2015/0002416 A1* | 1/2015 | Koike .................. G06F 3/0414 345/173 |
| 2015/0009424 A1 | 1/2015 | Fujita |
| 2015/0242007 A1* | 8/2015 | Iwaizumi ................ G06F 3/016 345/173 |
| 2015/0242008 A1 | 8/2015 | Beckman |

FOREIGN PATENT DOCUMENTS

| | | |
|---|---|---|
| JP | 2001-109557 A | 4/2001 |
| JP | 2005-196310 A | 7/2005 |
| JP | 2006-209684 A | 8/2006 |
| JP | 2008-021094 A | 1/2008 |
| JP | 2010-134625 A | 6/2010 |
| JP | 4633167 B2 | 2/2011 |
| JP | 2011-54025 A | 3/2011 |
| JP | 2011-129091 A | 6/2011 |
| JP | 2011-221640 A | 11/2011 |
| WO | 2011024457 A1 | 3/2011 |
| WO | 2011024459 A1 | 3/2011 |
| WO | 2011074187 A1 | 6/2011 |
| WO | 2012001859 A1 | 1/2012 |

OTHER PUBLICATIONS

Office Action mailed Jun. 30, 2015, corresponding to Japanese patent application No. 2013-553275.
International Search Report mailed Mar. 5, 2013, corresponds to International Application No. PCT/JP2013/000113.
Written Opinion mailed Mar. 5, 2013, corresponds to International Application No. PCT/JP2013/000113.
International Search Report; PCT/JP2012/000535; May 1, 2012.
Office Action in JP Application No. 2015-195038, mailed Jul. 19, 2016.

* cited by examiner

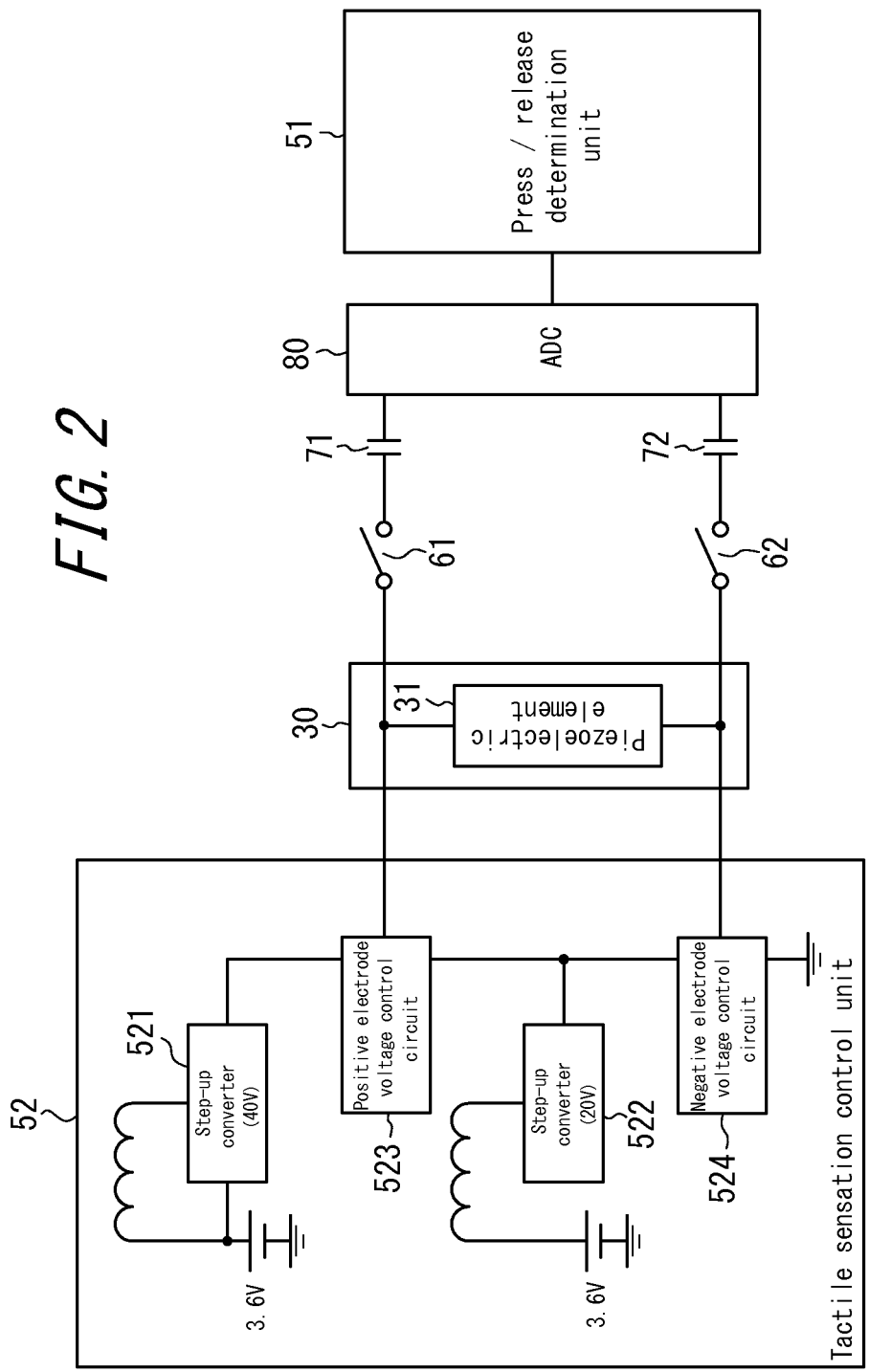

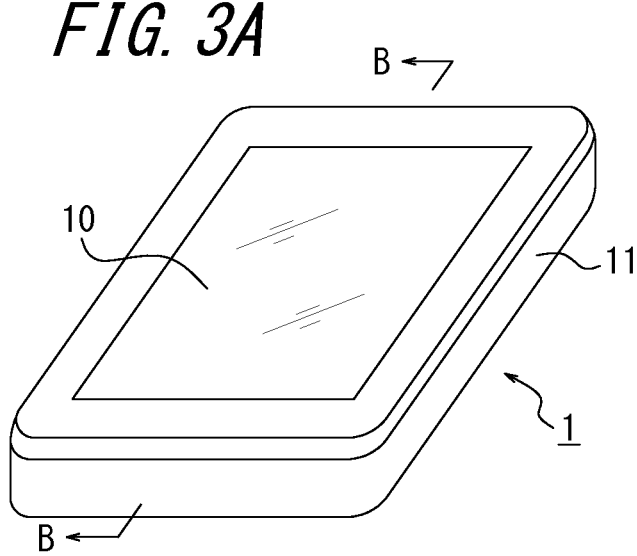
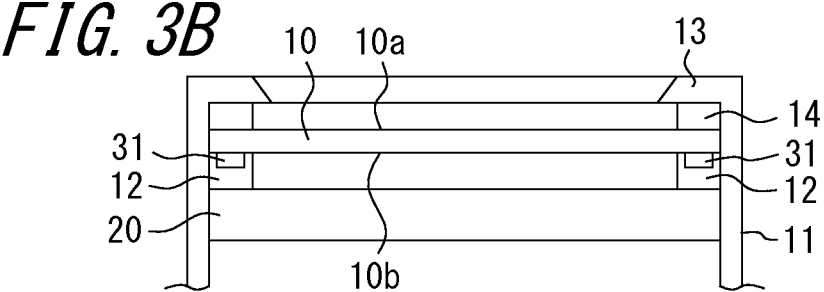
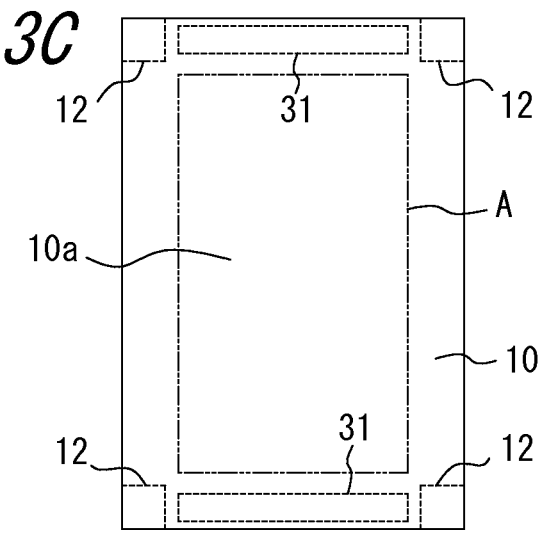

FIG. 9

```
if( pre_ave_power == 0 )
{
    tilt = TILT_NONE;  // Prevent the first vector from being tilted plus all the time
}
else if( pre_ave_power >= (ave_power + rel_vect) )
{
    tilt = TILT_MINUS;  // Tilt Minus
}
else if( pre_ave_power <= (ave_power - 0x3 * vect_pow - (user_calibration.a.fn * 2 / up_times)))
{
    tilt = TILT_PLUS;  // Tilt Plus
}
else  tilt = TILT_NONE;
```

Minus direction vector is determined.

Plus direction vector is determined. Vect_pow prevents a sharp rise immediately after vibration from being determined erroneously as press.

FIG. 11

```
if(getV < base_getV && upfate_times==8){
    base_getV=getV;
}
```

ADC value after 16ms from vibration is set as a reference.

FIG. 12

```
if(update_times > 400){
    if(user_calibration.a_fn < 12){
        rel_vect = 0x40;
        down_thresh = 3;
    }
    else{
        rel_vect =0x40;
        down_thresh = 3;
    }
}
else if(update_times > 150){
    if ((USHORT)0xC > (USHORT)user_calibration.a_fn){
        rel_vect = 0x20;
        down_thresh = 4;
    }
    else{
        rel_vect = 0x20;
        down_thresh = 3;
    }
}
else{
    if ((USHORT)0xC > (USHORT)user_calibration.a_fn){
        rel_vect = 0x10;
        down_thresh = 2;
    }
    else{
        rel_vect = 0x10;
        down_thresh = 3;
    }
}
```

When the period of time after press (value of update_times) exceeds a certain value, it is regarded as a hold state, and the value of release threshold vector is increased.

The value of user_calibratuon.a_fn is determined based on the pressed position. The value of less than 12 represents a position such as corners of panel where voltage is not detected appropriately. On the position where voltage is not detected appropriately, voltage restores to reference voltage sooner and decline rate is hugh, thus value of release threshold vector should be increased.

FIG. 14

```
if (peek_ave_power <= (base_ad_value + 4000)){   // Light press
    rel_vect = 10;
    down_thresh = 3;
}
else if (peek_ave_power >= (base_ad_value + 6000) && ave_power > 37000 && base_ad_value < 30000){
    rel_vect = 35;
}
else if (peek_ave_power >= (base_ad_value + 6000) && ave_power > 31500 && base_ad_value < 30000){
    rel_vect = 20;
}
else if(base_ad_value > 35000 && ave_power > base_ad_value + 3000){    // First time or wait reference voltage
    rel_vect = (ave_power - base_ad_value)/80;
}
else if( peek_ave_power > 45000 && ave_power > 32500){   // Strong press
    rel_vect = (ave_power - 31500)/30;
}
else if(ave_power > (base_ad_value + 6500) && peek_ave_power < 41000 && ave_power > 32500){   // Consecutive press
    rel_vect = (ave_power - 31500)/200;
}
else if(ave_power > (base_ad_value + 6500) && ave_power > 32500){   // Consecutive press
    rel_vect = (ave_power - 31500)/120;
}
else{
    rel_vect = 16;
}
```

The calculation of release threshold vector varies depending on the maximum value, reference value and the like of ADC value.

ELECTRONIC DEVICE AND CONTROL METHOD OF ELECTRONIC DEVICE

CROSS REFERENCE TO RELATED APPLICATION

This application is a National Phase of International Application Number PCT/JP2013/000113, filed Jan. 11, 2013, and claims priority to and the benefit of Japanese Patent Application Nos. 2012-005560, 2012-005567 and 2012-005571 filed on Jan. 13, 2012, the entire contents of which are incorporated herein by reference.

FIELD

The present invention relates to an electronic device and a control method of an electronic device.

BACKGROUND

Recently, in electronic devices such as mobile phones, smartphones, tablet terminals, game machines, PCs (Personal Computers), electronic books, ATMs (Automated Teller Machines), automatic ticket vending machines, automatic vending machines, printers, copy machines, fax (facsimile) and the like, a growing number of electronic devices are equipped with a tactile sensation providing function that provides a tactile sensation to the operator when he/she operates a panel (for example, see Patent Literature 1).

CITATION LIST

Patent Literature

PTL 1: The publication of Japanese Patent No. 4633167

SUMMARY OF INVENTION

The present invention is to provide an electronic device that may improve a tactile sensation providing function and may provide a tactile sensation appropriately without causing any discomfort to the operator and a control method of the electronic device.

The electronic device according to the present invention to achieve the above mentioned matter includes:
  a tactile sensation providing unit configured to provide a tactile sensation to a contact object being in contact with a panel; and
  a controller configured to control the tactile sensation providing unit on the basis of amount of change of data based on press to the panel.

The electronic device according to claim 1, in that the controller controls the tactile sensation providing unit based on a temporal amount of change of the data and a threshold of amount of change.

The controller calculates a vector indicating a temporal amount of change of the data and a polarity of the amount of change and controls the tactile sensation providing unit based on the vector and a threshold vector.

The threshold vector has a press threshold vector in which the vector corresponds to a plus direction vector that indicates an increase in the amount of change and a release threshold vector in which the vector corresponds to a minus direction vector that indicates a decrease in the amount of change.

The absolute value of the press threshold vector is larger than that of the release threshold vector.

The controller controls the tactile sensation providing unit based further on the data and a data threshold corresponding to the data.

Furthermore, a control method of the electronic device according to the present invention to achieve the above mentioned object is a control method of an electronic device configured to control a tactile sensation providing unit that provides a tactile sensation to a contact object being in contact with a panel by a controller, the method includes a step of controlling the tactile sensation providing unit on the basis of amount of change of data based on press to the panel.

Furthermore, the electronic device according to the present invention to achieve the above mentioned matter includes:
  a tactile sensation providing unit configured to provide a tactile sensation to a contact object being in contact with a panel; and
  a controller configured to control the tactile sensation providing unit on the basis of amount of change of data based on press to the panel and a threshold of amount of change, wherein
  the controller changes, after the tactile sensation providing unit provides a tactile sensation, the threshold of amount of change.

The controller reduces, after the tactile sensation providing unit provides a tactile sensation, the threshold of amount of change with time.

The controller increases, after the tactile sensation providing unit provides a tactile sensation, the threshold of amount of change with time.

The controller changes, after the tactile sensation providing unit provides a tactile sensation, the threshold of amount of change according to the position of contact of the contact object to the panel.

Furthermore, a control method of an electronic device according to the present invention to achieve the above mentioned object is a control method of an electronic device configured to control a tactile sensation providing unit that provides a tactile sensation to a contact object being in contact with a panel by a controller on the basis of amount of change of data based on press to the panel and a threshold of amount of change, the method includes a step of changing, after the tactile sensation providing unit provides a tactile sensation, the threshold of amount of change.

Moreover, an electronic device according to the present invention to achieve the above mentioned matter includes:
  a tactile sensation providing unit configured to provide a tactile sensation to a contact object being in contact with a panel; and
  a controller configured to control the tactile sensation providing unit on the basis of amount of change of data based on press to the panel and a threshold of amount of change, wherein
  the controller changes, after the tactile sensation providing unit provides a tactile sensation, the threshold of amount of change according to a maximum value of the data based on press to the panel.

Furthermore, a control method of an electronic device according to the present invention to achieve the above mentioned matter is a control method of an electronic device configured to control a tactile sensation providing unit that provides a tactile sensation to a contact object being in contact with a panel by a controller on the basis of amount of change of data based on press to the panel and a threshold of amount of change, the method includes a step of changing, after the tactile sensation providing unit provides a tactile sensation, the threshold of amount of change according to a maximum value of the data based on press to the panel.

According to the present invention, a tactile sensation providing function may be improved and a tactile sensation may be provided appropriately without causing any discomfort to the operator.

BRIEF DESCRIPTION OF DRAWINGS

FIG. 2 is a certain partial circuit diagram relating to a piezoelectric element in FIG. 1;

FIGS. 3A-3C are diagrams illustrating respectively an example of a mounting structure of the electronic device in FIG. 1;

FIG. 9 is a diagram illustrating an example of a certain source code of a vector determination portion of a press/release determination unit of an electronic device according to a second embodiment;

FIG. 11 is a diagram illustrating an example of a certain source code of a change portion of a reference value of the press/release determination unit of the electronic device according to the second embodiment;

FIG. 12 is a diagram illustrating an example of a certain source code of the change portion of the release threshold vector of the press/release determination unit of the electronic device according to the second embodiment;

FIG. 14 is a diagram illustrating an example of a certain source code of a change portion of a release threshold vector of a press/release determination unit of an electronic device according to a third embodiment;

DESCRIPTION OF EMBODIMENTS

Embodiments of the present invention will now be described with reference to the accompanying drawings.
(First Embodiment)

Figure 1:
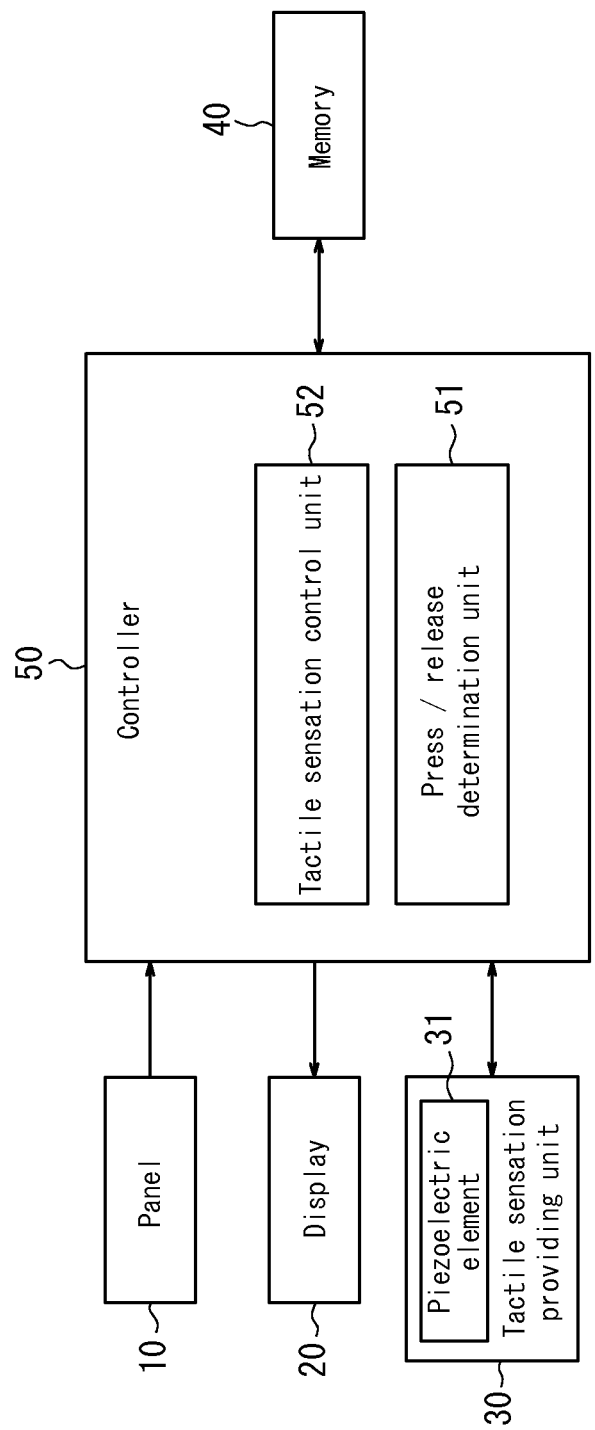
FIG. 1 is a block diagram illustrating a schematic configuration of an electronic device according to a first embodiment.

FIG. 1 is a block diagram illustrating a schematic configuration of an electronic device according to a first embodiment of the present invention. The electronic device 1 illustrated in FIG. 1 has a panel 10, a display 20, a tactile sensation providing unit 30, a memory unit 40 and a controller 50. The controller 50 has a press/release determination unit 51 and a tactile sensation control unit 52.

The panel 10 is disposed normally on the front surface of the display 20, and detects, on the operation face of the panel 10, contact or release of contact of a contact object (e.g. a finger or a stylus pen) to an object displayed on the display 20. In addition, the panel 10 detects contact of a contact object to the operation face and supplies a signal according to the detected contact position to the controller 50. The panel 10 is configured using a known type, such as a resistive film type, a capacitive type and the like.

The display 20 is configured using, for example, a liquid crystal display panel (LCD), an organic EL display panel and the like, is controlled by the controller 50 and displays objects such as characters, images, videos and the like.

The tactile sensation providing unit 30 is configured using, for example, a piezoelectric element 31. The piezoelectric element 31 is disposed on the backside of the panel 10, which is opposite the operation face thereof, and generates vibration of a predetermined vibration pattern in response to the drive signal (drive voltage) applied from the tactile sensation control unit 52. Thereby, the piezoelectric element 31 provides a predetermined tactile sensation to a contact object being in contact with the operation face of the touch panel 10.

Then, an output voltage (analog data) obtained from the piezoelectric element 31 based on press to the panel 10 is supplied to the press/release determination unit 51. That is, in the electronic device 1 according to the present embodiment, the piezoelectric element 31 is used as a tactile sensation providing element and as a press detection element (a press detection element as an acceleration sensor, that is, an element that outputs a voltage in response to a pressure applying velocity or acceleration).

The memory unit 40 stores operation programs and various thresholds of the electronic device 1 in a nonvolatile manner, and various calculation results and the like in a nonvolatile or volatile manner as well.

The controller 50 controls the entire operation of the electronic device 1, and determines the processing to be executed based on the information input from the panel 10. The press/release determination unit 51 obtains an output voltage from the piezoelectric element 31 based on press to the panel 10, determines press or release based on the obtained output voltage, and supplies the determination result to the tactile sensation control unit 52.

The tactile sensation control unit 52 applies a predetermined drive signal to the piezoelectric element 31 based on the determination result from the press/release determination unit 51. Thereby, the piezoelectric element 31 provides a predetermined tactile sensation to a contact object being in contact with the operation face of the panel 10.

FIG. 2 is an exemplified partial circuit diagram relating to the piezoelectric element 31 in FIG. 1. One electrode (positive electrode) and the other electrode (negative electrode) of the piezoelectric element 31 are connected to the tactile sensation control unit 52. Then, the positive electrode and the negative electrode of the piezoelectric element 31 are connected to ADC (analog-digital converter) 80 via changeover switches 61 and 62 and capacitors 71 and 72. In addition, the output from ADC 80 (data based on press (ADC value, digital data)) is input to the press/release determination unit 51.

The tactile sensation control unit 52 includes step-up converters 521 and 522, a positive electrode voltage control circuit 523 and a negative electrode voltage control circuit 524. The step-up converters 521 and 522 increase an input voltage and generate a predetermined voltage. The positive electrode voltage control circuit 523 receives the voltage generated by the step-up converter 521 and generates a drive signal for positive electrode under control of the controller 50. The generated drive signal for positive electrode is applied to the positive electrode of the piezoelectric element 31. Then, the negative electrode voltage control circuit 524 receives the voltage generated by the step-up converter 522 and generates a drive signal for negative electrode under control of the controller 50. The generated drive signal for negative electrode is applied to the negative electrode of the piezoelectric element 31.

Then, when the controller 50 causes the piezoelectric element 31 to function as a press detection element, it turns on the changeover switches 61 and 62. Thereby, the output voltage from the piezoelectric element 31 passes through the capacitors 71 and 72, is converted into ADC value by ADC 80, and is supplied to the press/release determination unit 51. Here, for the output voltage from the piezoelectric element 31, DC component thereof is cut by the capacitors 71 and 72, and only AC component (fluctuation) is supplied to ADC80. ADC80 has, for example, an intermediate potential of about 1.5V, and with the intermediate potential as a reference value (reference voltage), the potential on the input side (the side of the capacitors 71 and 72) of ADC80 fluctuates.

In addition, when the controller 50 causes the piezoelectric element 31 to function as a tactile sensation providing element, it turns off the changeover switches 61 and 62 so that a drive signal applied to the piezoelectric element 31 is not input to ADC80. In this state, according to the determination result by the press/release determination unit 51, the controller 50 causes the tactile sensation control unit 52 to apply a drive signal for positive electrode to the positive electrode side of the piezoelectric element 31, and to apply a drive signal for negative electrode to the negative electrode side of the piezoelectric element 31, thereby causing the piezoelectric element 31 to vibrate.

Here, for the drive signal for positive electrode and the drive signal for negative electrode applied to the piezoelectric element 31, in order to prevent the piezoelectric element 31 from being in a depolarized state, the minimum voltage of the drive signal for positive electrode should be equal to or more than the maximum voltage of the drive signal for negative electrode. For example, when the withstand voltage of the piezoelectric element 31 is 40V, the controller 50 causes, with the intermediate potential of 20V, the step-up converter 521 of the tactile sensation control unit 52 to increase the input voltage of 3.6V, for example, to generate an output voltage of 40V, and causes the step-up converter 522 to increase the input voltage of 3.6V to generate an output voltage of 20V.

Then the controller 50 causes the positive electrode voltage control circuit 523 to generate, for example, a half cycle sine wave drive signal for positive electrode, with an amplitude of 20V to 40V, and to apply the generated drive signal for positive electrode to the positive electrode of the piezoelectric element 31. In addition, the controller 50 causes the negative electrode voltage control circuit 524 to generate a half cycle inverse-phase sine wave drive signal for negative electrode, with an amplitude of 0V to 20V, and to apply the generated drive signal for negative electrode to the negative electrode of the piezoelectric element 31. Thereby, the piezoelectric element 31 provides a predetermined tactile sensation to a contact object being in contact with the operation face of the panel 10. Note that the tactile sensation control unit 52 may, as long as within a range in which no depolarization of the piezoelectric element 31 occurs, apply a voltage that is lower than that for the negative electrode to the positive electrode.

FIGS. 3A-3C illustrate an example of a mounting structure of the electronic device 1 illustrated in FIG. 1. FIG. 3A is an appearance perspective view. FIG. 3B is a schematic cross sectional view taken from line B-B in FIG. 3A. FIG. 3C is a plan view of the main part. The electronic device 1 illustrated in FIG. 3 is what is called a smartphone. The display 20 is enclosed and held in a housing 11. The panel 10 is held above the display 20 via an insulator 12 made of an elastic member. The panel 10 is held above the display 20 via insulators 12 provided respectively at the four corners, away from a display region A of the display 20 illustrated in FIG. 3C by phantom lines.

In addition, in the housing 11, an upper cover 13 is provided so as to cover a surface region of the panel 10, which is away from the display region of the display 20. An insulator 14 made of an elastic member is provided between the upper cover 13 and the panel 10.

Note that, for the panel 10 illustrated in FIG. 3, the surface member having an operation face (surface) 10a is made of, for example, transparent film or glass, and the back side member having a back face 10b is made of glass or acrylic. The panel 10 is configured so that, when its operation face 10a is pressed, the pressed portion thereof bends (strains) slightly or the structure itself bends slightly according to the pressing force.

On the back side 10b of the panel 10, piezoelectric vibrators 31 to vibrate the panel 10 are provided respectively, via adhesive or the like, near each of two opposing sides. The two piezoelectric vibrators 31 are driven in parallel or independently, thereby causing the panel 10 to vibrate, and the operation face 10a vibrates. Note that, in FIG. 3C, the housing 11, the upper cover 13 and the insulator 14 illustrated in FIG. 3B are omitted.

Figure 4A:
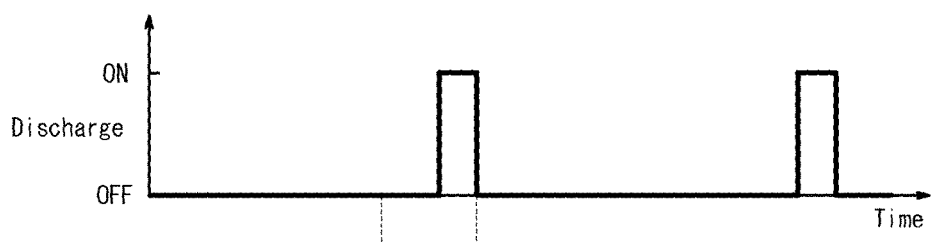
FIGS. 4A-4C are diagrams for explaining respectively a basic determination algorithm when a piezoelectric element is used as a tactile sensation providing element and as a press detection element.
Figure 4B:
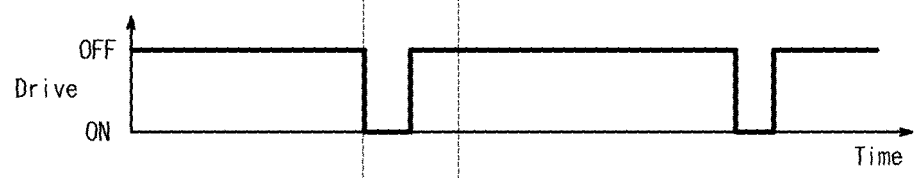
Figure 4C:
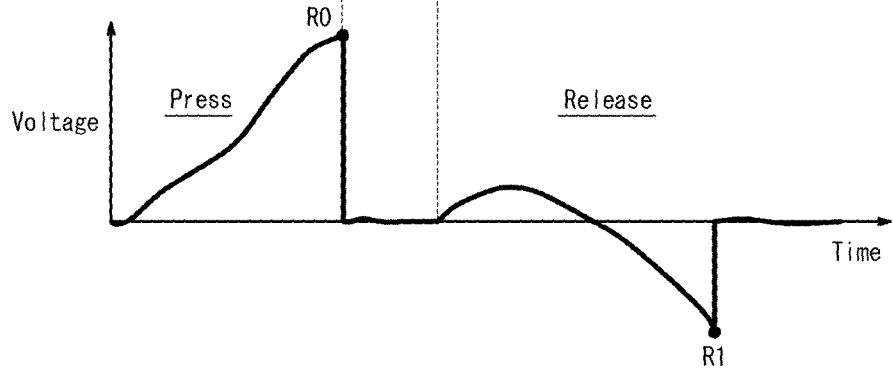

Here, the algorithm for determining press/release of the contact object to/from the panel 10 is discussed. FIGS. 4A-4C are diagrams illustrating a basic determination algorithm when the piezoelectric element 31 is used as a tactile sensation providing element and as a press detection element. FIG. 4A is a timing chart illustrating a discharge timing of the piezoelectric element 31. FIG. 4B is a timing chart illustrating a drive timing of the piezoelectric element 31. FIG. 4C is a diagram illustrating an output voltage from the piezoelectric element 31 supplied to the input side of ADC 80. In this determination algorithm, first, the controller 50 causes the piezoelectric element 31 to function as a press detection element. Then, in the press/release determination unit 51, when the output voltage from the piezoelectric element 31 based on press of a contact object to the panel 10 by the operator reaches the threshold voltage ($R_0$) and is determined as press, the controller 50 causes the piezoelectric element 31 to function as a tactile sensation providing element. Thereby, the tactile sensation control unit 52 drives the piezoelectric element 31 and provides a tactile sensation to the operator. Then, after the piezoelectric element 31 is driven, in order to restore the output voltage from the piezoelectric element 31 to the reference voltage, the controller 50 executes processing of discharging the charge of the piezoelectric element 31 in the discharge circuit (charge discharge processing).

After that, the controller 50 causes the piezoelectric element 31 to function as a press detection element, and when the operator removes the contact object from the panel 10 (release), the output voltage from the piezoelectric element 31 changes from the reference voltage to the minus direction. In the press/release determination unit 51, when the output voltage from the piezoelectric element 31 reaches the threshold voltage ($R_1$) and is determined as release, the controller 50 causes the piezoelectric element 31 to function as a tactile sensation providing element, and causes the tactile sensation control unit 52 to drive the piezoelectric element 31. Thereby, the piezoelectric element 31 provides a tactile sensation to the operator. Then, after driving the piezoelectric element 31, in order to restore the output voltage from the piezoelectric element 31 to the reference voltage, the controller 50 executes charge discharge processing of the piezoelectric element 31 to be prepared for the next determination operation.

Figure 5:
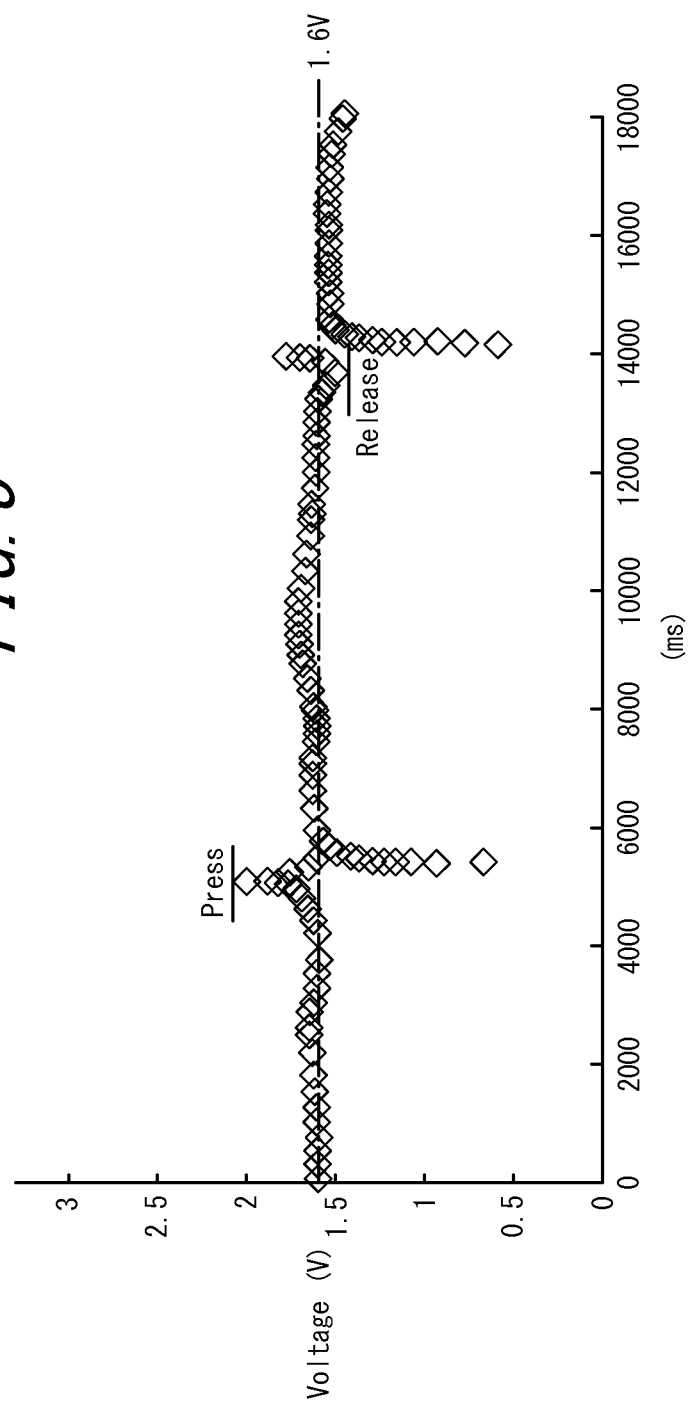
FIG. 5 is a diagram illustrating a certain change in an output voltage of the piezoelectric element based on the basic determination algorithm in FIG. 4.

FIG. 5 is a diagram illustrating a certain change in the output voltage from the piezoelectric element 31 based on the basic determination algorithm illustrated in FIG. 4. Here, the reference voltage is 1.6V. In the basic determination algorithm, for example, a threshold voltage for determining that press has been performed (hereinafter referred to as a press threshold voltage) and a threshold voltage for determining that release has been performed (hereinafter referred to as a release threshold voltage) are set respectively. Then, the press/release determination unit 51 determines, when the obtained output voltage value (ADC value) is more than the press threshold voltage (data threshold), that press has been performed, and when the obtained output voltage value is less than the release threshold voltage (data threshold), that release has been performed. In this case, it is assumed that the release threshold voltage is set lower than the reference voltage.

However, when the piezoelectric element 31 functions as a press detection element, it detects acceleration of depression (press acceleration). In this case, the piezoelectric element 31 has a characteristic in that it naturally discharges the charge accumulated by bending if there is no change in bending of the piezoelectric element 31. Therefore, when a contact object such as a finger is released from the panel 10, if the contact object is released slowly and not quickly, that is, the contact object is released in a manner of press pattern of, what is called a "slow release," a voltage lower than the reference voltage may not be detected from the piezoelectric element 31. As a result thereof, even if the contact object is released from the panel 10 before the output voltage reaches the release threshold voltage, it may be determined as a press state being kept.

Figure 6:
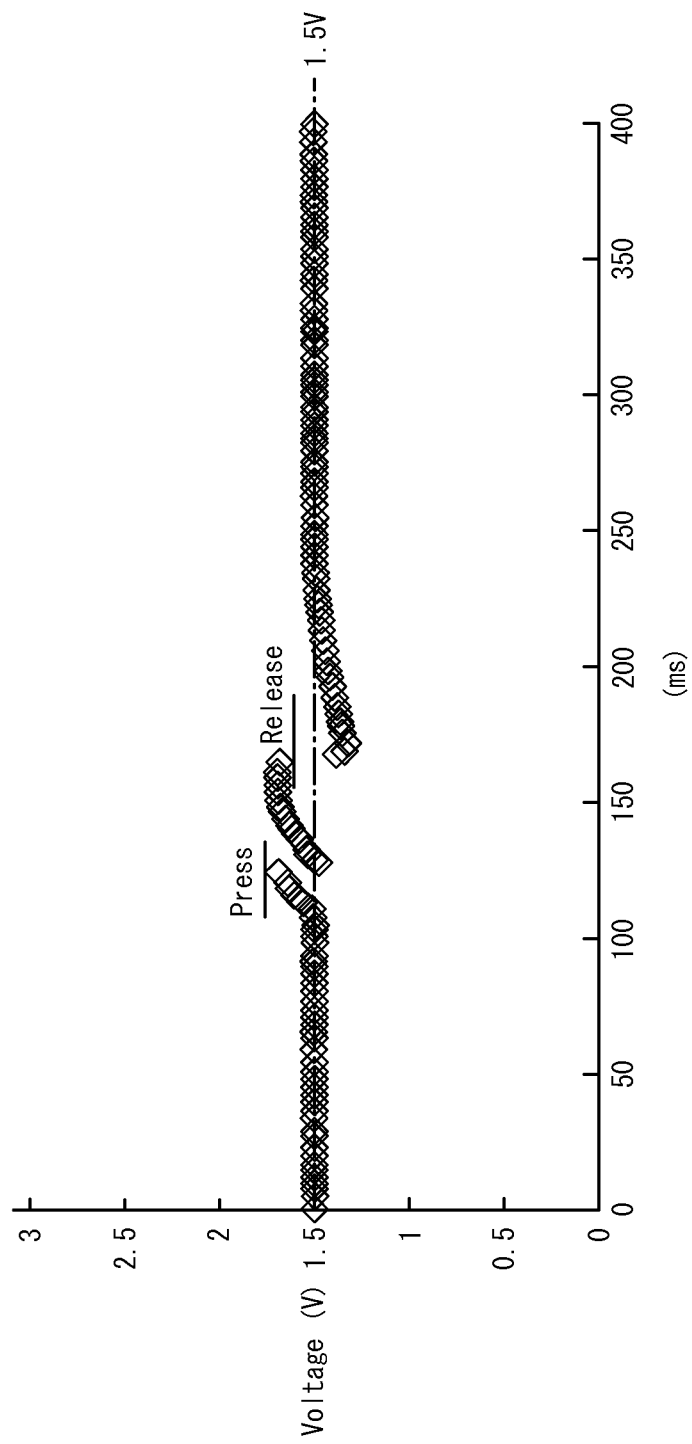
FIG. 6 is a diagram illustrating, in the basic determination algorithm in FIG. 4, an example of a certain change in an output voltage of the piezoelectric element when a release threshold voltage is set based on a voltage value after a charge discharge processing of the piezoelectric element.

As a method of solving such an inconvenience, it is assumed that a release threshold voltage is set based on the voltage value after the charge discharge processing of the piezoelectric element 31 (after the tactile sensation providing unit provides a tactile sensation). Thereby, even if the contact object is released from the panel 10 slowly, release may be determined FIG. 6 is a diagram illustrating an example of a certain change in the output voltage from the piezoelectric element 31 in this case. Although FIG. 6 illustrates a case where the release threshold voltage is set higher than the reference voltage, the release threshold voltage may be set lower than the reference voltage. Here, the reference voltage is 1.5V. Note that, in FIG. 6, as described later, the press/release determination unit 51 determines the case where the obtained output voltage value is less than the release threshold voltage and the absolute value of the amount of change (negative amount of change) of the output voltage value satisfies (is more than) the absolute value of the release threshold vector (threshold of amount of change) as "release."

Also, the investors observed that, through their diligent experiments and examinations, in press/release, it is not always the case that the output voltage from the piezoelectric element 31 will take the waveform as illustrated in FIG. 6, and depending on the pressing state and the like by the operator, the waveform changes every time. For example, the inventors have found that the voltage value detected for the first time after the charge discharge processing, the amount of change and the direction of the change (positive or negative change) of the voltage detected after the charge discharge processing vary in each charge discharge processing. Thus, an accurate determination of press/release may be difficult.

Therefore, in the electronic device 1 according to the present embodiment, a press threshold voltage as well as a release threshold voltage are set based on the voltage value after the charge discharge processing of the piezoelectric element 31 (ADC value obtained by the press/release determination unit 51). The press threshold voltage (in the case where a plurality of press threshold voltages are provided, and as a press to the panel 10 is increased, input at a plurality of stages may be accepted based on the plurality of press threshold voltages, for example, the press threshold voltage at the second stage) is set, for example, if a tactile sensation providing operation is not executed for over a predetermined period of time and the output voltage is the reference value, to an initial threshold voltage that is higher than the reference value by a predetermined voltage. In addition, after a tactile sensation providing operation is executed, within a predetermined period of time after the latest provision of a tactile sensation, a press threshold voltage is set based on the output voltage in the predetermined period of time. In this case, for example, the press threshold voltage is set to a value obtained by adding a predetermined voltage to is the output voltage at the point in time when a certain period of time has elapsed from provision of a tactile sensation by the tactile sensation providing unit (from the start of the tactile sensation providing processing or the end thereof), or from the charge discharge processing (from the start of the charge discharge processing or the end thereof) plus a predetermined voltage. Note that, in this case, a press threshold voltage may not be set before elapse of the certain period of time, and whatever the ADC value the press/release determination unit 51 obtains, it may not be determined as "press." Also, the press threshold voltage may be set, for example, based on an output voltage after a tactile sensation is provided to the latest press (or after the charge discharge processing after provision of a tactile sensation) (the output voltage (ADC value) detected for the first time by the press/release determination unit 51), to the voltage value that is higher than the output voltage by a predetermined voltage.

Next, the release threshold voltage is set, for example, to a value obtained by subtracting a predetermined voltage from the output voltage at the point in time when a certain period of time has elapsed from, for example, provision of a tactile sensation by the tactile sensation providing unit (from the start of the tactile sensation providing processing or the end thereof), or from the charge discharge processing (from the start of the charge discharge processing or the end thereof). In addition, the release threshold voltage may be set, based on an output voltage after the latest provision of a tactile sensation (or after the charge discharge processing after the provision of a tactile sensation) (the output voltage value (ADC value) detected for the first time by the press/release determination unit 51), to the voltage value that is lower than the output voltage by a predetermined voltage.

Thereby, the press threshold voltage and the release threshold voltage are changed and set each time the tactile sensation providing unit provides a tactile sensation.

Note that, as described above, the piezoelectric element 31 has a characteristic in that, it naturally discharges charge accumulated due to bending, thereby, even if the contact object is released from the panel 10 after it is pressed against the panel, the output voltage lower than the reference voltage may not be detected from the piezoelectric element 31. Therefore, as described above, if the release threshold voltage is lower than the reference voltage when it is set to the above described value, that is, the value of the output voltage at the point in time when a certain period of time has elapsed minus a predetermined voltage, it may be set to a predetermined voltage (e.g. a voltage higher than the reference voltage by a predetermined voltage).

Note that, as described above, in press/release, the output voltage from the piezoelectric element 31 may not always take the waveform illustrated in FIG. 6, and the waveform may change significantly each time depending on the press condition of the operator and the like. Therefore, in the electronic device 1, in order to reduce the possibility that the output voltage from the piezoelectric element 31 exceeds the press threshold voltage or falls below the release threshold voltage without operator's intention, the press threshold voltage and the release threshold voltage may be set based on the amount of change in the output voltage after the charge discharge processing (after provision of a tactile sensation). For example, when a press threshold voltage is set to a value, which is the output voltage at the point in time when a certain period of time has elapsed plus a predetermined voltage, if the absolute value of the amount of change in the output voltage after the charge discharge processing is large, the predetermined voltage may be set to a large value, and if the absolute value thereof is small, the predetermined voltage may be set to a small value. Similarly, when the release threshold voltage is set to a value, which is the output voltage at the point in time when the certain period of time has elapsed minus a predetermined voltage, if the absolute value of the amount of change of the output voltage after the charge discharge processing is large, the predetermined voltage may be set to a large value, and if the absolute value thereof is small, the predetermined voltage may be set to a small value.

Figure 7:
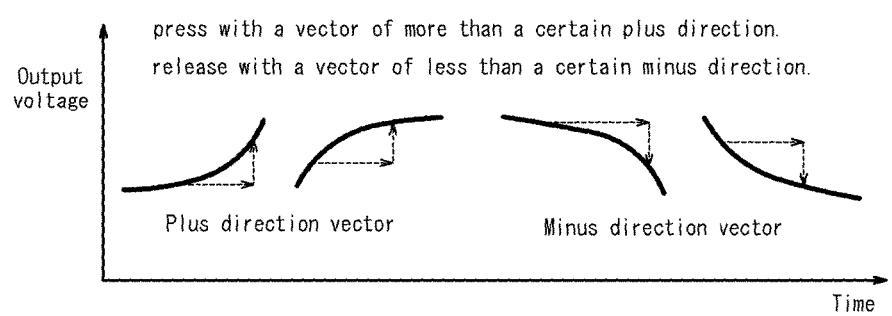
FIG. 7 is a schematic diagram schematically illustrating a vector calculated by a press/release determination unit in FIG. 1.

Furthermore, in the electronic device 1 according to the present embodiment, not only the press threshold voltage and the release threshold voltage, that is, the fixed threshold voltage (data threshold) corresponding directly to the output voltage value of the piezoelectric element 31, but also the threshold vector corresponding to the change in output voltage are used. Thereby, in the press/release determination unit 51, ADC value is obtained from ADC 80, and from the obtained ADC value, as schematically illustrated in FIG. 7, a vector indicating a temporal amount of change in ADC value and the polarity of the amount of change is calculated as well.

Then, the press/release determination unit 51 compares the obtained ADC value with the press threshold voltage and the release threshold voltage, which are data threshold stored in the memory unit 40, and compares the calculated vector with the press threshold vector and the release threshold vector stored in the memory unit 40 as well.

As a result thereof, if the calculated vector is a plus direction vector indicating an increase in the amount of change, and its absolute value (amount of change) satisfies the absolute value of the press threshold vector (threshold of amount of change) a predetermined number of times in the press/release determination processing performed, for example, every 2 ms (e.g. if the absolute value of plus direction vector is larger than the absolute value of the press threshold vector, it is determined as "satisfied"), and the obtained ADC value satisfies the press threshold voltage as well, the press/release determination unit 51 determines it as "press." Then, if the calculated vector is a minus direction vector indicating a decrease in the amount of change, and its absolute value (amount of change) satisfies the absolute value of the release threshold vector (threshold of amount of change) a predetermined number of times in the press/release determination processing performed, for example, every 2 ms (e.g. if the absolute value of minus direction vector is larger than the absolute value of the release threshold vector, it is determined as "satisfied"), and the obtained ADC value satisfies the release threshold voltage as well, the press/release determination unit 51 determines it as "release." The determination result of press/release by the press/release determination unit 51 is supplied to the tactile sensation control unit 52.

Here, the calculation of vector and the press/release determination processing by the press/release determination unit 51 are executed, for example, every 2 ms by using the average value calculated from the ADC values, that are obtained 10 times for about 40 μs. Then, the absolute value of the press threshold vector used for the determination of press is set larger than that of the release threshold vector used for the determination of release. That is, when pressing, if a force is continued to be applied, the ADC value continues to rise until it becomes physically impossible to rise, however, when releasing, if a contact object is released, it is impossible to decrease the ACD value any more. Thus, if the absolute value of the release threshold vector is set to the same value as that of the press threshold vector, it is more likely to cause a "withheld release" (a phenomenon in which even if a contact object is released, release vibration may not be generated). Thereby, for the release threshold vector, the conditions are eased (e.g. the absolute value of the release threshold vector is set smaller than that of the press threshold vector) to allow easy determination of release. In addition, for the release threshold vector, when the release threshold voltage is set to the value closer to the reference value, the absolute value is set smaller than the case where the value is set far from the reference value to allow easy determination of release.

Furthermore, for the press threshold vector, when the press threshold voltage is set to the value which is far from the reference value, the absolute value thereof may be set smaller than the case where it is set to the value which is close to the reference value. Although the piezoelectric element 31 outputs a voltage when it is pressed and deformed, with an increasing amount of deformation thereof, its elastic force increases, thereby hardly be deformed. Therefore, in the piezoelectric element 31, when the amount of deformation increases and output voltage becomes large, in order to change the output voltage further, a larger force is required compared to the case where the output voltage is small. Therefore, as described above, for the press threshold vector, when the press threshold voltage is set to a value which is far from the reference value, the absolute value thereof is set smaller than the case where the value is set close to the reference value, thereby improving the user operability whether the press threshold voltage is far from or close to the reference value.

In addition, when the press/release determination unit 51 performs, as described above, the press/release determination processing at intervals of a predetermined period of time, and determines "press/release" when it determines that the absolute value of the vector of the output voltage (ADC value) from the piezoelectric element 31 is larger than the absolute value of the press/release threshold vector a predetermined times in a row, the absolute value of the press/release threshold vector may gradually be decreased with each press/release determination processing. Since the piezoelectric element 31 has a characteristic in that it naturally discharges the charge accumulated due to bending, even if the bending state is kept, the output voltage becomes small with time. With such decrease in the output voltage with time in mind, the absolute value of the press/release threshold vector may be decreased gradually each time the press/release determination processing is performed.

In the tactile sensation control unit 52, according to the determination result from the press/release determination unit 51, a predetermined drive signal is applied to the piezoelectric element 31. Thereby a tactile sensation is provided to the operator who presses the panel 10.

According to the electronic device 1 of the above described embodiment, the output voltage (ADC value) from the piezoelectric element 31 is obtained and a vector indicating the temporal amount of change in the output voltage and the polarity of the amount of change is calculated as well, thus a waveform of the output voltage caused by fluctuation of the contact object that is pressed/released by the operator may be recognized. Therefore, the press state and the release state may be recognized by comparing the vector with the threshold vector, thereby allowing a reliable determination of press/release for which a tactile sensation is provided, even in the case of multistage press/release. Therefore, a tactile sensation providing function may be improved and a tactile sensation may be provided appropriately without causing any discomfort to the operator.

(Second Embodiment)

The press pattern of the panel 10 by the operator includes four patterns such as, for example, "normal press/release," "repeated strikes," "hold" and "slow release." The "repeated strikes" is a press pattern by which press and release are consecutively repeated in a short period of time. The "hold" is a press pattern by which, release is performed not immediately after press, and the press state is held for a while, and then release is performed, which is so called a "long press." The "slow release" is a press pattern by which, as described above, when release is performed, the contact object is released from the panel 10 not immediately, but slowly. The "normal press/release" is a common press pattern belonging to none of the above described three patterns, and is a press pattern by which the panel 10 is pressed and is immediately released.

Figure 8:
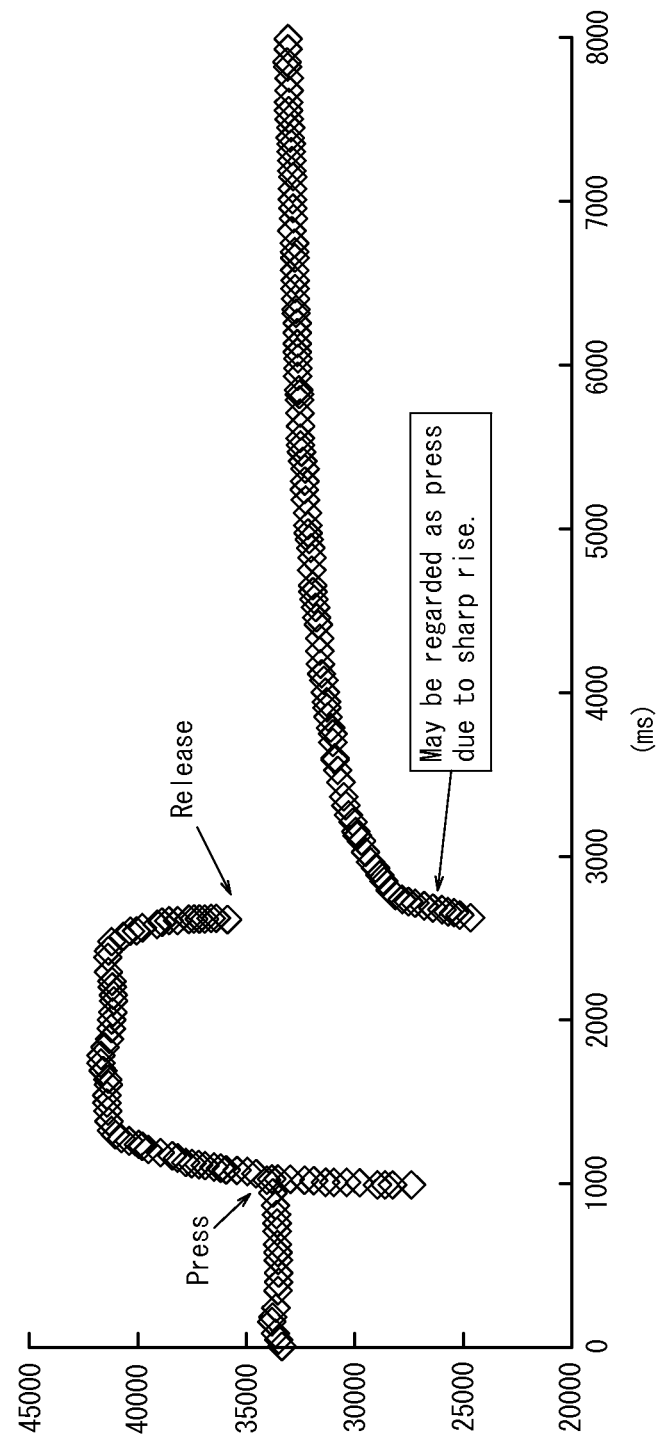
FIG. 8 is a diagram illustrating a change in an output voltage of the piezoelectric element in a press pattern of "normal press/release"

In the case of "normal press/release," as described above, according to the determination result from the press/release determination unit 51, the piezoelectric element 31 is driven by the tactile sensation control unit 52, and the output voltage from the piezoelectric element 31 changes, for example, as illustrated in FIG. 8. Note that, in FIG. 8, for convenience sake, the vertical axis represents ADC value by ADC 80. ADC value is "0" at a minimum, "65520" at a maximum, and the reference value (reference voltage of 1.5V) is around the middle, which is "32760."

As illustrated in FIG. 8, in the case of "normal press/release," for example, after the piezoelectric element 31 discharges its charge after press vibration, ADC value rises sharply from the value that is equal to or less than the reference value. Then, after the piezoelectric element 31 discharges its charge immediately after the release vibration, for example, ADC value rises sharply and then rises slowly toward the value which is slightly larger than the reference value. Thereby, if the absolute value of the press threshold vector is set in a fixed manner, the vector after provision of a press/release tactile sensation satisfies the press threshold vector and may be determined erroneously as press.

Thereby, in the electronic device according to the second embodiment of the present invention, in the electronic device 1 according to the first embodiment, after the piezoelectric element 31 provides a press/release tactile sensation, further, in the press/release determination unit 51, control is made so that the threshold vector for press/release determination is changed. In detail, in the output voltage waveform as illustrated in FIG. 8, in order to prevent the sharp rise in the voltage after provision of a tactile sensation from being determined as press, the absolute value of the press threshold vector is set larger immediately after the start of calculation of vector after provision of a tactile sensation, then is decreased with time.

FIG. 9 illustrates an example of certain source code of vector determination portion in the press/release determination unit 51 in this case. The variables illustrated in FIG. 9 are as follows:

"pre_ave_power": ADC value obtained when the previous vector is determined;

"ave_power": ADC value obtained when the present vector is determined;

"rel_vect": Absolute value of release threshold vector;

"tilt": Direction of vector [TILT_NONE: No change, TILT_MINUS: Minus direction, TILT_PLUS: Plus direction];

"vect_pow": The value "100" is assigned immediately after press, and the value is decreased by "1" until it becomes "0" each time a vector is determined;

"user_calibration.a_fn": Value for in-plane calibration in response to the contact position on the panel 10; and "up_times": The number of times a plus direction vector is generated consecutively.

In FIG. 9, "else if (pre_ave_power>=(ave_power+rel_vect))" indicates the determination portion of minus direction vector. Then, the "else if (pre_ave_power<=(ave_power−0×3*vect_pow−(user_calibration.a_fn*2/up_times)))" indicates the determination portion of plus direction vector, and "vect_pow" prevents the sharp rise in voltage immediately after provision of a tactile sensation from being determined erroneously as press.

Figure 10:
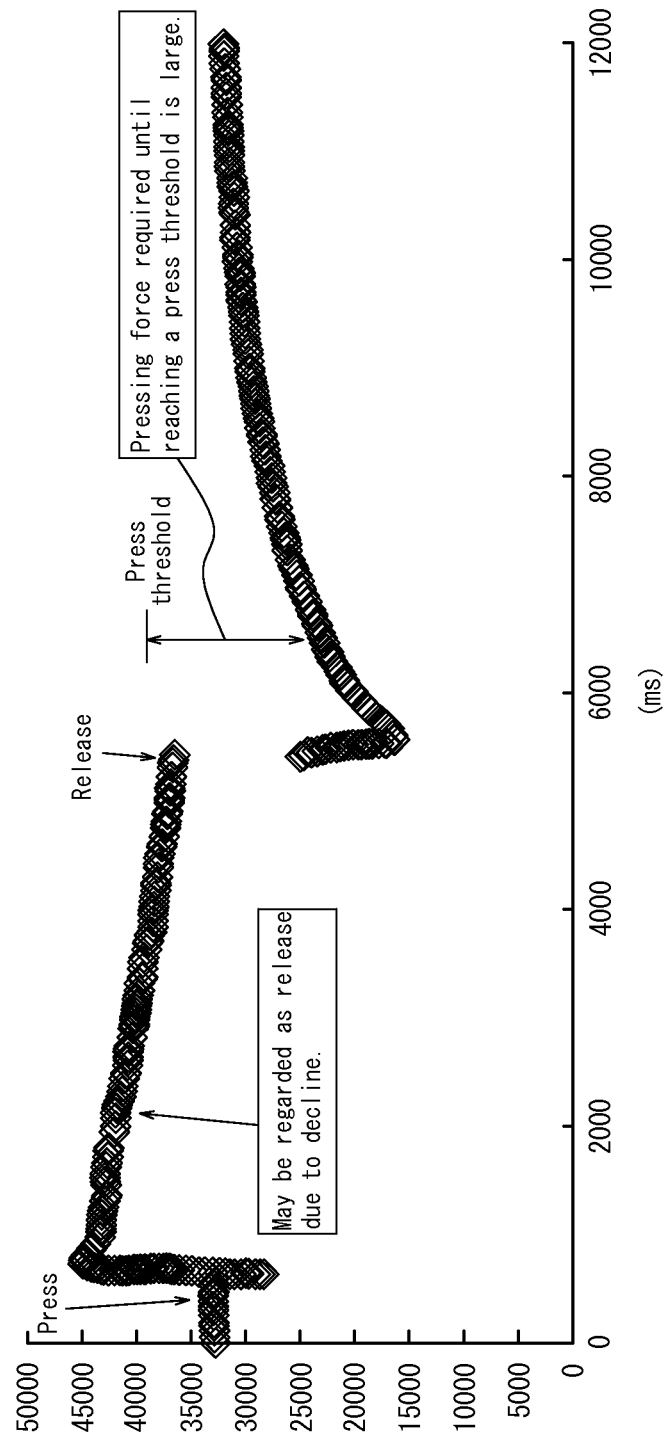
FIG. 10 is a diagram illustrating a change in an output voltage of the piezoelectric element in a press pattern of "hold"

Then, when the press pattern is "hold," the output voltage from the piezoelectric element 31 changes, for example, as illustrated in FIG. 10. The change in the output voltage in this case is basically the same as that of the "normal press/release." However, even while the pressing force is kept after press, ADC value declines gently. Thereby, if the release threshold vector is set in a fixed manner, it may be determined erroneously as release.

Furthermore, after release vibration, for example, ADC value declines once, and restores slowly from the value that is significantly lower than the reference value to the reference value at a low speed. Thus, when a multistage press/release processing of two or more stages is performed in the same region of the panel 10, the width of ADC value required for ADC value to reach the press threshold voltage for the next press becomes wider than the normal one, which increases a force required for press, thereby causing discomfort to the operator.

Then, in the electronic device 1 according to the present embodiment, in the press/release determination unit 51, when the press pattern is "hold," the absolute value of the release threshold vector after provision of a tactile sensation is further increased with time. The actual source code in this case is "else if (pre_ave_power>=(ave_power+rel_vect))" in FIG. 9, in which "rel_vect" is a value by which a decline during "hold" is not regarded as release. Note that, the voltage decline rate of the piezoelectric element 31 varies depending on the pressed position on the panel 10, thereby the value of "rel_vect" is changed by "ser_calibration.a_fn" depending on the pressed position.

Furthermore, the press/release determination unit 51 sets, when it changes the setting of the press threshold voltage based on the voltage value after the charge discharge processing of the piezoelectric element 31, the ADC value at the point in time when a predetermined period of time has elapsed from provision of a release tactile sensation, that is, the ADC value at the point in time when a predetermined period of time has elapsed from the start of obtaining the ADC value after provision of a release tactile sensation, as a reference value. Then, the press/release determination unit 51 changes the press threshold voltage so that the difference from the reference value will be a constant value, in accordance with the reference value that has been set.

FIG. 11 is a diagram illustrating an example of a certain source code of the changed portion of the reference value in the press/release determination unit 51 in this case. Then, FIG. 12 is a diagram illustrating an example of a certain source code of the changed portion of the release threshold vector. Variables indicated newly in FIGS. 11 and 12 are as follows:

"getV": Obtained ADC value;

"base_getV": ADC value which will be a reference (reference value). The press threshold voltage varies based on the difference from the reference value. The default value is "0xFFFF."

"update_times": The number of times a press/release determination is performed after provision of a tactile sensation. The press/release determination is performed every 2 ms;

"down_thresh": The number of consecutive times the minus direction vector is detected to be determined as release.

FIG. 11 illustrates a case where the ADC value after 16 ms from the start of obtaining ADC value after provision of a release tactile sensation is set as a reference value. Then, FIG. 12 illustrates a case where, when the time period from the press (value of update_times) is a certain value or more, the press is regarded as "hold," and the value of the release threshold vector (rel_vect) increases with time. In addition, in FIG. 12, the position where the value of "user_calibration.a_fn" is less than "12" represents the position where a voltage is not detected appropriately, such as corners of the panel 10. On such positions, compared with the center of the panel 10, the value restores to the reference voltage sooner, and the decline rate is high, thereby the release threshold vector is set to a larger value. Furthermore, compared with the center of the panel 10, on the position where voltage is not detected appropriately such as corners of the panel 10, the value of the press threshold vector may be set to a smaller value.

According to the electronic device 1 of the present embodiment described above, the threshold vector after provision of a tactile sensation is changed with time according to the press pattern, thereby, in addition to the effect by the first embodiment, in the press pattern of "normal press/release," a sharp rise in the absolute value of the plus direction vector after provision of a tactile sensation may be prevented from being determined erroneously as "press." In addition, in the press pattern of "hold," the hold state of pressing force may be prevented from being determined erroneously as "release."

(Third Embodiment)

On the other hand, in the configuration illustrated in FIG. 2, the output voltage of the piezoelectric element 31 detected by ADC 80 depends on the capacity of capacitors 71 and 72 connected to the input side of ADC 80, and when the capacity is small (e.g. 1 µF), compared with the case where the capacity is large (e.g. 10 µF), time constant is small, and less time is required to restore to the reference voltage. In the electronic device 1 according to the present embodiment, the capacity of capacitors 71 and 72 is small such as, for example, 1 µF.

Figure 13:
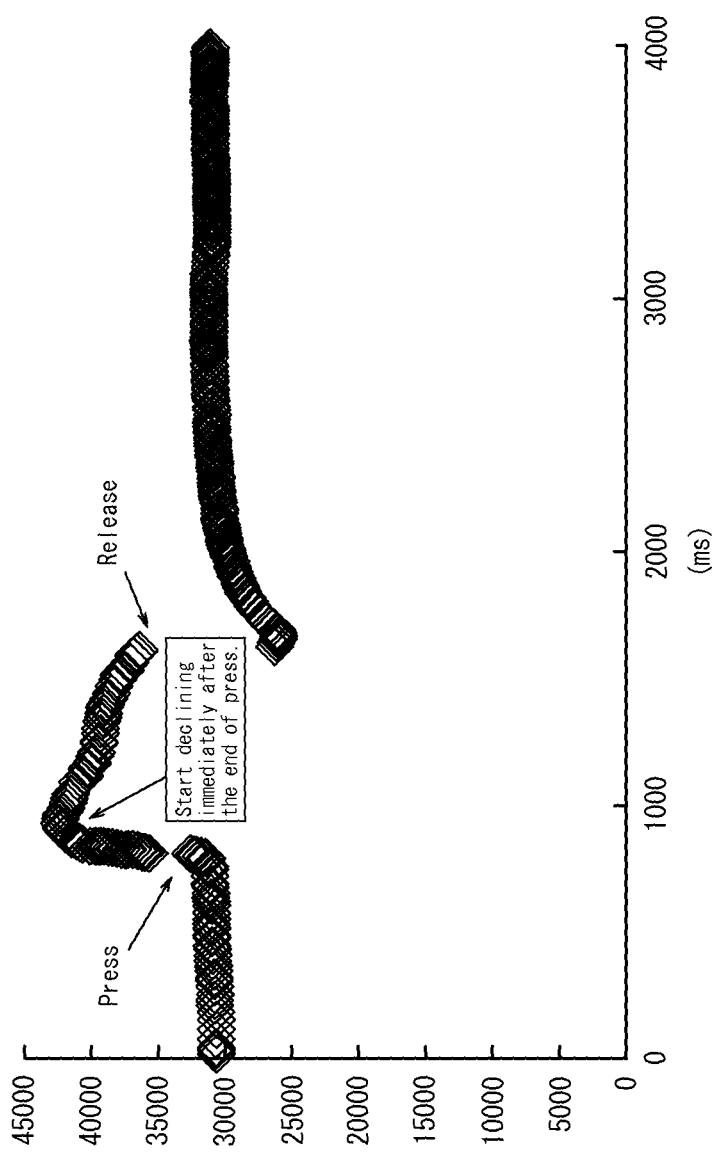
FIG. 13 is a diagram illustrating a change in an output voltage of the piezoelectric element in a press pattern of "normal press/release"

In this case, for example, in the normal press/release operation by which the panel 10 is pressed and then released immediately and continuous press, as described above, when the piezoelectric element 31 is driven by the tactile sensation control unit 52 based on the determination result from the press/release determination unit 51, the output voltage from the piezoelectric element 31 changes, for example, as illustrated in FIG. 13. FIG. 13 illustrates change in the output voltage in the press pattern of "normal press/release." In addition, in FIG. 13, for convenience sake, output voltage is represented as ADC value by ADC 80 on the vertical axis. ADC value is "0" at a minimum, "65520" at a maximum, and the reference value (reference voltage of 1.5V) is around the middle, which is "32760."

As obvious from FIG. 13, in the case of normal press/release, the output voltage starts declining immediately after the end of press. Then, the decline rate increases as the ADC value increases. Thus, if the release threshold vector is set in a fixed manner, erroneous determination of release may occur.

Thus, in the electronic device according to the third embodiment of the present invention, in the electronic device 1 according to the first embodiment, after the tactile sensation providing unit 30 provides a tactile sensation, further, the press/release determination unit 51 changes the threshold vector based on the maximum value (initial local maximum value) of obtained ADC value. In detail, a tactile sensation is provided by the piezoelectric element 31 when pressed, further, discharge processing of the piezoelectric element 31 is performed, then when detection of output voltage from the piezoelectric element 31 is started, the press/release determination unit 51 changes the absolute value of release threshold vector according to the maximum value of the obtained ADC value, such that the larger the maximum value, the larger the change.

FIG. 14 is a diagram illustrating an example of a source code of the changed portion of the release threshold vector by the press/release determination unit 51 in this case. The variables illustrated in FIG. 9 are as follows:

"peek_ave_power": The maximum value of ADC value

"base_ad_value": Reference value of ADC value

"rel_vect": Absolute value of release threshold vector;

"down_thresh": The number of consecutive times the minus direction vector is detected to be determined as release.

"ave_power": ADC value obtained when the present vector is determined;

Note that, in FIG. 14, calculation method of release threshold vector varies depending on the maximum value, reference value and the like of ADC value.

As described above, according to the electronic device 1 of the present embodiment, after a tactile sensation for press is provided, the absolute value of the release threshold vector is changed based on the maximum value of obtained ADC value, thus, in addition to the effect by the first embodiment, even if the ADC value declines immediately after the end of press, the immediate decline may be prevented from being erroneously determined as "release." Therefore, a tactile sensation providing function may be improved and a tactile sensation may be provided appropriately without causing any discomfort to the operator.

Note that the present invention is not limited to the above described embodiment, and variety of modifications and changes may be made. For example, in comparison of ADC value and threshold voltage by the press/release determination unit 51, the ADC value satisfies the press threshold voltage may be when the ADC value reaches the press threshold voltage, when the ADC value exceeds the press threshold voltage or when the press threshold voltage is detected by the press/release determination unit 51. In addition, the ADC value satisfies the release threshold voltage may be when the ADC value reaches the release threshold voltage, when the ADC value falls below the release threshold voltage, or when the release threshold voltage is detected by the press/release determination unit 51. Similarly, the vector satisfies the threshold vector may be when the absolute value of the vector reaches the absolute value of the threshold vector, when the absolute value of the vector exceeds the absolute value of the threshold vector, or when the threshold vector is calculated by the press/release determination unit 51.

Then, in the above described embodiment, both press and release are determined. However, the electronic device may be configured to determine either press or release to provide a tactile sensation. Furthermore, press/release determination processing may be performed based on a comparison between the vector calculated from the ADC value and a predetermined determination threshold vector, without using a threshold voltage.

In addition, the panel 10 and the display 20 may be integrated into a device that includes a common substrate having both of these functions. An example of such device is a liquid crystal panel having a matrix of pixel electrodes, with a plurality of photoelectric conversion elements, such as photodiodes, regularly mixed therein. In such device, images are displayed by a liquid crystal panel structure, and on the other hand, the backlight for the liquid crystal display is reflected by the tip of pen that contacts with the desired position on the surface of the panel for input, and the light reflection thereof is received by the peripheral photoelectric conversion elements, thereby the contact position may be detected.

Furthermore, in the above described embodiment, the panel 10 is used to detect contact to the operation face 10a, and it is also possible to determine that contact has been made when the output voltage from the piezoelectric element 31 satisfies the reference voltage corresponding to a predetermined press load.

In addition, the press detection element that obtains data based on press against the panel 10 may be provided independently, without sharing the piezoelectric element with the tactile sensation providing element. Therefore, in this case, as a press detection element, a vector of output voltage may be detected by using a piezoelectric element and a strain gauge, and a vector of contact area of the panel 10 may also be detected. Then, as a tactile sensation providing element, a vibration motor (eccentric motor) may be used and, by vibrating the motor, the touch face 10a of the panel 10 may be vibrated indirectly.

Furthermore, in the above described embodiments, the reference value (reference voltage) is 1.5V or 1.6V, however, in the present invention, the reference value is not limited thereto, and may be 0V. In addition, in the above described embodiments, as the data based on press, ADC value, which is digital data, is used. However, in the present invention, the data based on press is not limited thereto, and may be an output voltage, which is analog data. Then, all of the processing according to the present invention, including data threshold, may be processed by analog data.

REFERENCE SIGNS LIST

1 Electronic device
10 Panel
20 Display
30 Tactile sensation providing unit
31 Piezoelectric element
40 Memory unit
50 Controller
51 Press/release determination unit
52 Tactile sensation control unit
61,62 Changeover switch
71,72 Capacitor
80 ADC (analog digital converter)
521,522 Step-up converter
523 Positive electrode voltage control circuit
524 Negative electrode voltage control circuit

The invention claimed is:

1. An electronic device, comprising:
a tactile sensation providing unit configured to provide a tactile sensation to a contact object being in contact with a panel; and
a controller configured to control the tactile sensation providing unit on the basis of an amount of change of voltage based on press to the panel in comparison with a threshold, wherein the threshold is changed after the tactile sensation providing unit provides the tactile sensation according to a position of contact of the contact object to the panel.

2. An electronic device, comprising:
a tactile sensation providing unit configured to provide a tactile sensation to a contact object being in contact with a panel; and
a controller configured to control the tactile sensation providing unit on the basis of an amount of change of data based on press to the panel in comparison with a threshold, wherein the threshold is changed after the tactile sensation providing unit provides the tactile sensation,
wherein the controller controls the tactile sensation providing unit based on a temporal amount of change of the data and a threshold of amount of change.

3. An electronic device, comprising:
a tactile sensation providing unit configured to provide a tactile sensation to a contact object being in contact with a panel; and
a controller configured to control the tactile sensation providing unit on the basis of an amount of change of data based on press to the panel,
wherein the controller calculates a vector indicating the temporal amount of change of the data and a polarity of the amount of change, and based on the vector and a threshold vector, controls the tactile sensation providing unit.

4. The electronic device according to claim 3, wherein the threshold vector has a press threshold vector in which the vector corresponds to a plus direction vector indicating an increase in the amount of change and a release threshold vector in which the vector corresponds to a minus direction vector indicating a decrease in the amount of change.

5. The electronic device according to claim 4, wherein an absolute value of the press threshold vector is larger than an absolute value of the release threshold vector.

6. The electronic device according to claim 2, wherein the controller controls the tactile sensation providing unit based further on the data and a data threshold corresponding to the data.

7. A control method of an electronic device configured to control a tactile sensation providing unit that provides a tactile sensation to a contact object being in contact with a panel by a controller, the method comprising:
   controlling the tactile sensation providing unit based on an amount of change of voltage based on press to the panel in comparison with a threshold, wherein the threshold is changed after the tactile sensation providing unit provides the tactile sensation according to a position of contact of the contact object to the panel.

8. An electronic device, comprising:
   a tactile sensation providing unit configured to provide a tactile sensation to a contact object being in contact with a panel; and
   a controller configured to control the tactile sensation providing unit based on an amount of change of data based on press to the panel and a threshold of amount of change, wherein
   after the tactile sensation providing unit provides a tactile sensation, the controller changes the threshold of amount of change.

9. The electronic device according to claim 8, wherein the controller decreases, after the tactile sensation providing unit provides a tactile sensation, the threshold of amount of change with time.

10. The electronic device according to claim 8, wherein the controller increases, after the tactile sensation providing unit provides a tactile sensation, the threshold of amount of change with time.

11. The electronic device according to claim 8, wherein the controller changes, after the tactile sensation providing unit provides a tactile sensation, the threshold of amount of change depending on a position of contact of the contact object to the panel.

12. A control method of an electronic device configured to control a tactile sensation providing unit that provides a tactile sensation to a contact object being in contact with a panel based on an amount of change of data based on press to the panel and a threshold of amount of change, including a step of
   after the tactile sensation providing unit provides a tactile sensation, changing the threshold of amount of change.

13. An electronic device comprising:
   a tactile sensation providing unit configured to provide a tactile sensation to a contact object being in contact with a panel; and
   a controller configured to control the tactile sensation providing unit based on an amount of change of data based on press to the panel and a threshold of amount of change, wherein
   the controller changes, after the tactile sensation providing unit provides a tactile sensation, the threshold of amount of change based on a maximum value of the data based on press to the panel.

14. A control method of an electronic device configured to control a tactile sensation providing unit that provides a tactile sensation to a contact object being in contact with a panel based on an amount of change of data based on press to the panel and a threshold of amount of change, including a step of;
   after the tactile sensation providing unit provides a tactile sensation, changing the threshold of amount of change based on a maximum value of the data based on press to the panel.

* * * * *